United States Patent [19]

Barito et al.

[11] Patent Number: 4,681,788
[45] Date of Patent: Jul. 21, 1987

[54] INSULATION FORMED OF PRECIPITATED SILICA AND FLY ASH

[75] Inventors: Robert W. Barito; Kenneth L. Downs, both of Louisville, Ky.

[73] Assignee: General Electric Company, Louisville, Ky.

[21] Appl. No.: 891,157

[22] Filed: Jul. 31, 1986

[51] Int. Cl.4 .......................... B32B 1/00; B32B 1/10; B65B 31/00; E04B 1/74
[52] U.S. Cl. ........................................ 428/68; 53/434; 252/62; 156/303.1; 428/69; 428/76; 428/315.9; 428/446; 428/448
[58] Field of Search ....................... 252/62; 156/303.1; 53/434; 428/68, 69, 76, 315.9, 446, 448

[56] References Cited

U.S. PATENT DOCUMENTS

| 2,067,015 | 1/1937 | Munters | 220/452 |
|---|---|---|---|
| 2,164,143 | 6/1939 | Munters | 220/422 |
| 2,474,910 | 7/1949 | Pierce et al. | 428/402 |
| 2,513,749 | 7/1950 | Schilling | 220/422 |
| 2,768,046 | 10/1956 | Evans | 220/421 |
| 2,779,066 | 1/1957 | Gaugler et al. | 220/422 |
| 2,867,035 | 1/1959 | Patterson, Jr. | 220/452 |
| 2,961,116 | 11/1960 | Jeppson | 220/421 |
| 2,989,156 | 6/1961 | Brooks et al. | 220/422 |
| 3,094,071 | 6/1963 | Beckman | 220/422 |
| 3,166,511 | 1/1965 | Matsch et al. | 220/422 |
| 3,179,549 | 4/1965 | Strong et al. | 220/452 |
| 4,159,359 | 6/1979 | Pelloux-Gervais et al. | 428/76 |
| 4,349,051 | 9/1982 | Schilf | 138/149 |
| 4,359,496 | 11/1982 | Kratel et al. | 428/75 |
| 4,363,738 | 12/1982 | Kummermehr | 428/446 |
| 4,380,569 | 4/1983 | Shaw | 428/402 |
| 4,399,175 | 8/1983 | Kummermehr et al. | 428/76 |
| 4,430,108 | 2/1984 | Hojaji et al. | 428/446 |
| 4,444,821 | 4/1984 | Young et al. | 428/69 |

OTHER PUBLICATIONS

"The Condensed Chemical Dictionary", p. 783, Revised by G. G. Hawley, 1976 Eighth Edition, Van Nostrand Reinhold Company.
"Proceedings-The Royal Society", pp. 459-477.

Primary Examiner—William J. Van Balen
Attorney, Agent, or Firm—Frederick P. Weidner; Radford M. Reams

[57] ABSTRACT

Precipitated silica is mixed with a fly ash material and is employed as an insulating material having a low thermal conductivity. The mixture of precipitated silica and fly ash material is dried, compressed, placed in an evacuable pouch, and evacuated. The resulting board-like insulation configuration is used directly as insulation. The board-like material which is produced may be used as insulation in household refrigerators and freezers by placing it in an insulation space between the inner liner and the outer case and encapsulating the board-like material with a foamed insulating material.

19 Claims, 5 Drawing Figures

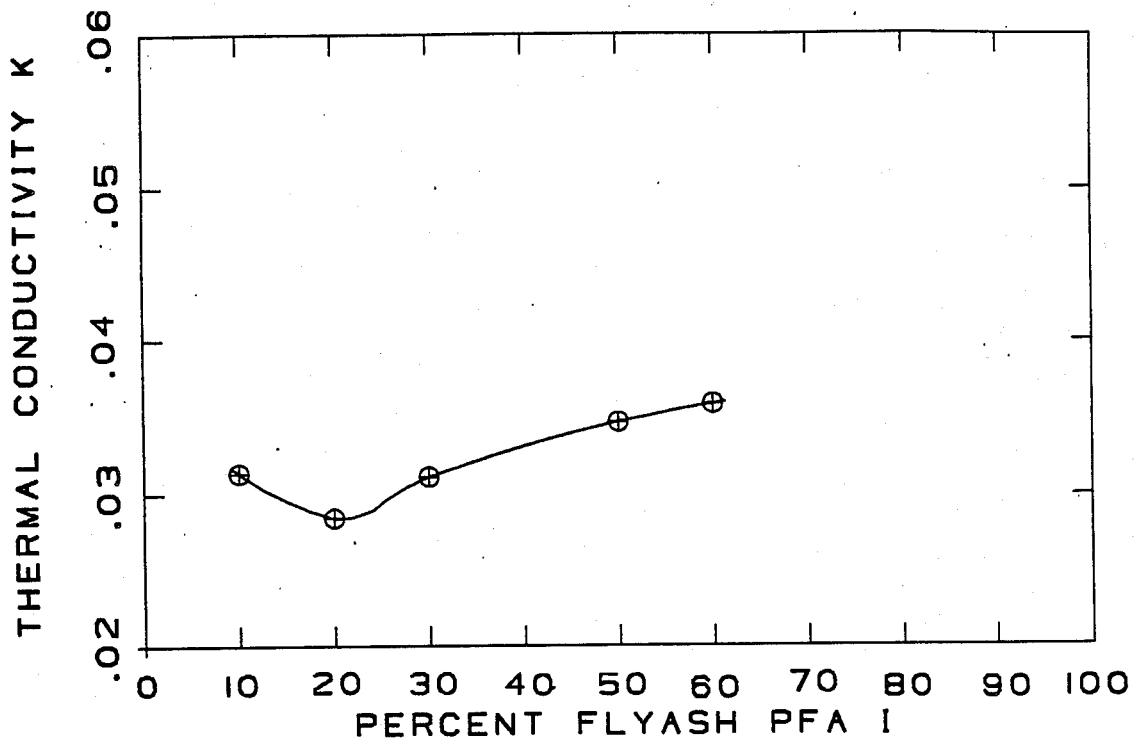
FIG. 1 PERCENT FLYASH VS THERMAL CONDUCTIVITY; PRECIPITATED SILICA AS BASE
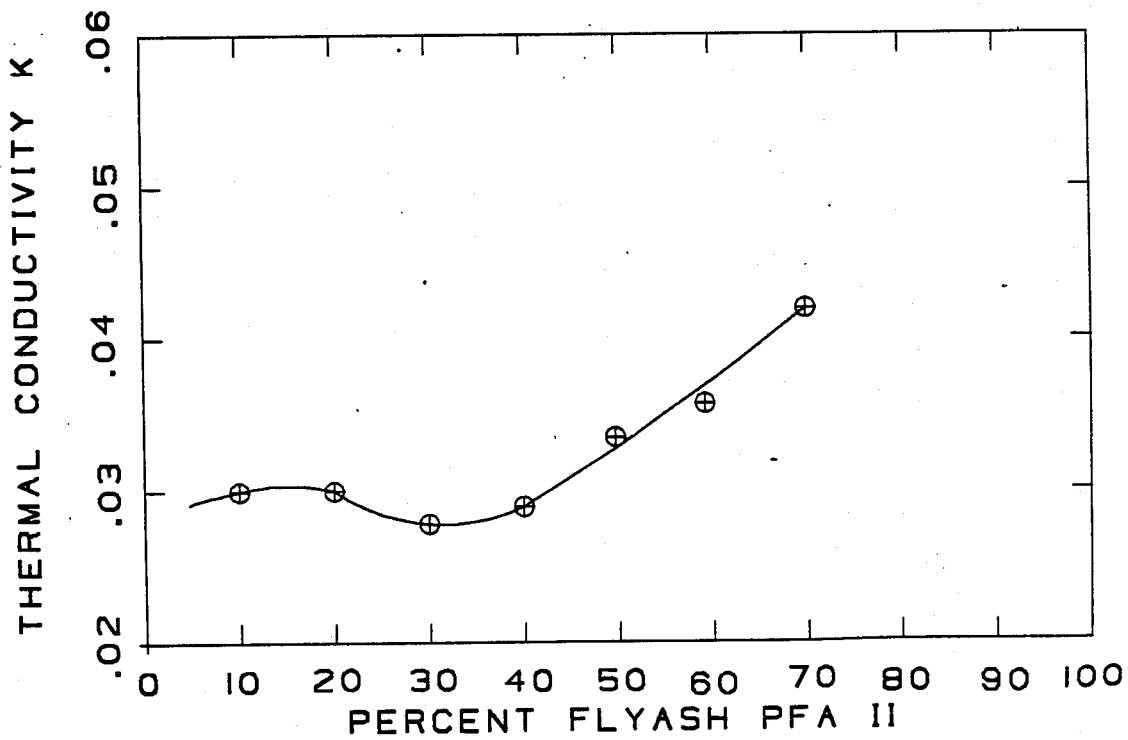
FIG. 2 PERCENT FLYASH VS THERMAL CONDUCTIVITY; PRECIPITATED SILICA AS BASE

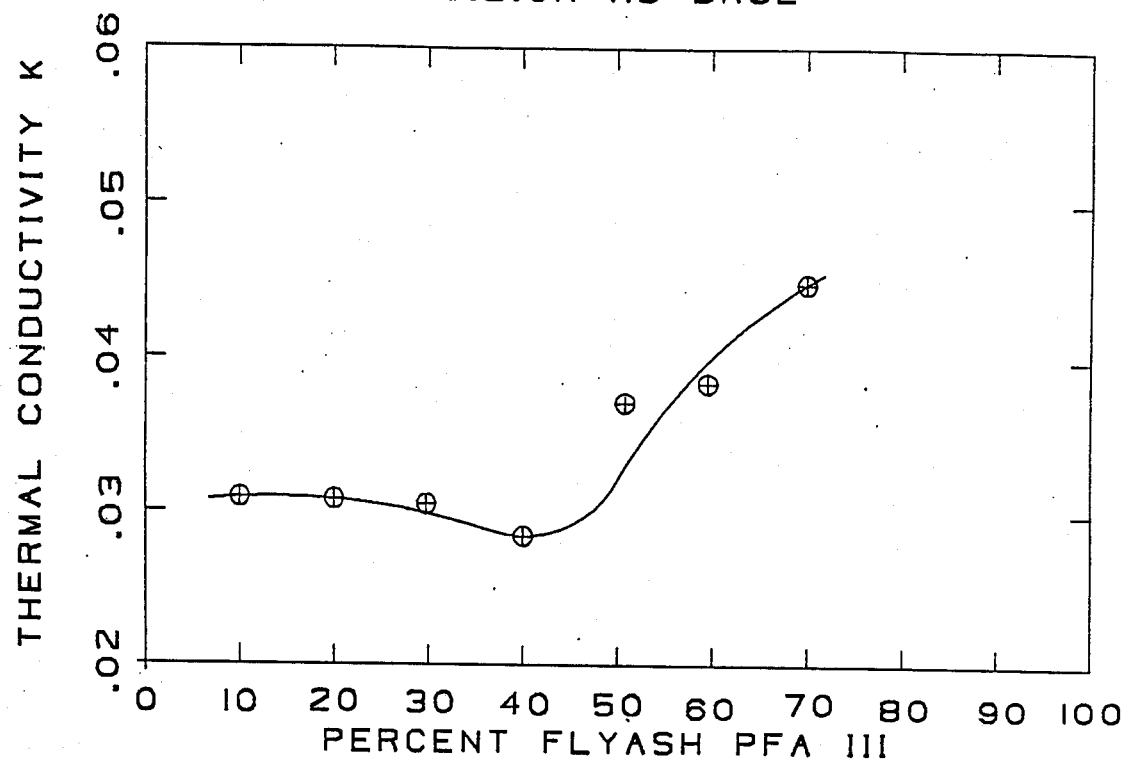
FIG. 3 PERCENT FLYASH VS THERMAL CONDUCTIVITY; PRECIPITATED SILICA AS BASE
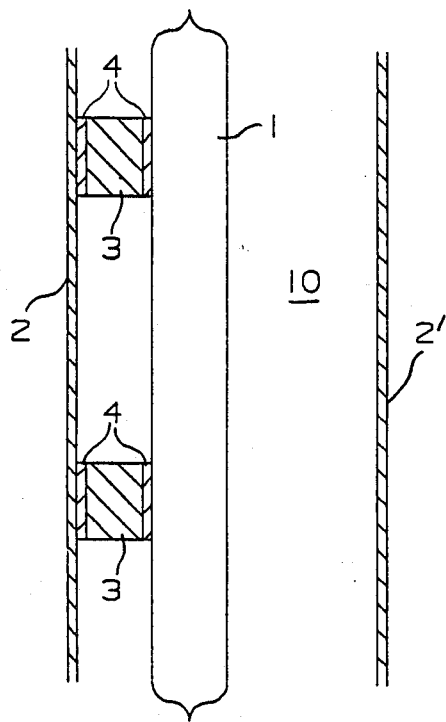
FIG. 4
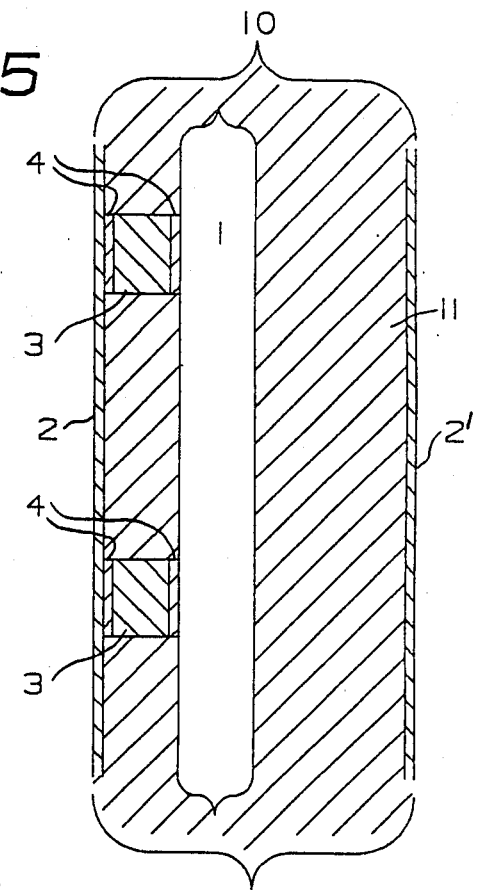
FIG. 5

INSULATION FORMED OF PRECIPITATED SILICA AND FLY ASH

BACKGROUND OF THE INVENTION

The design and development of thermal insulating materials, is an extensive art. Many systems have been developed employing, as the major insulating materials, various fibrous and powder products. There have also been a variety of ways for utilizing these materials, including the use of evacuated shells and bags, compression of the insulating materials, and varying orientations of the insulating materials.

Two of the most widely used thermal insulation materials are fiberglass and polyurethane foam. It is generally accepted that the thermal insulation quality of fiberglass is less than that of polyurethane foam. One advantage of fiberglass, however, is that it may be used as a thermal insulation in environments that involve rather high temperatures, that is above 150° F. Polyurethane foam on the other hand, while having a better thermal insulation quality than fiberglass, is detrimentally affected as an insulator when subjected to temperatures above 150° F. Therefore, these materials have both advantages and disadvantages.

In our copending application Ser. No. 699,930, filed Feb. 8, 1985, now U.S. Pat. No. 4,636,415, entitled "Precipitated Silica Insulator," assigned to the same assignee as the present invention, we have described the use of precipitiated silica as an insulator to achieve good insulating properties at relatively low cost. The precipitated silica, in accordance with that application, is dried at a temperature sufficient to drive off the surface water, is then compressed, placed in a gas and water tight envelope which is evacuated, and the gas and water tight pouch then sealed.

While the insulation formed with precipitated silica, as just described, is perfectly adequate, it would be extremely desirable to be able to obtain the same properties at a lower cost. By this invention a material is provided that accomplishes this desirable result and, at the same time, has better thermal insulation properties than fiberglass and can withstand elevated temperatures that would detrimentally affect polyurethane foam.

BRIEF DESCRIPTION OF THE INVENTION

In accordance with the present invention, it has unexpectedly been discovered that by combining precipitated silica, as described in our prior application, with fly ash and fly ash like materials, insulating materials having thermal insulating properties equivalent to those of the precipitated silica, alone, can be formed at a substantially lower cost. As used in the specification and claims such fly ash and fly ash-like materials will be collectively and separately referred to as "fly ash" or "fly ash materials." In view of the fact that these fly ash materials are, essentially, waste products and, frequently, have no known use, such a development is particularly significant. Further, material made in accordance with the present invention has certain advantages over conventional thermal insulation materials.

In thermal insulation for cooling equipment, such as is employed in the walls of refrigerators and freezers, it has been found that a desirable insulation has a K factor of 0.05 BTU-IN/HR. FT$^{2\circ}$ F., or less. Obviously, the lower the K factor, the better is the insulation. Employing mixtures of precipitated silica along with the fly ash materials, there being between 30% and 70%, by weight, of the fly-ash material such K factors have been obtained. Preferably, the ratio of precipitated silica to fly ash materials, on a weight basis, is 60:40 to 40:60.

The precipitated silica and fly ash are thoroughly mixed. They are then heated to drive off surface water. It is frequently found advantageous to place the silica - fly ash mixture into a microporous pouch during this heating operation, merely to provide containment during processing.

Subsequent to drying of the precipitated silica - fly ash mixture, it is placed into an envelope, the construction of which is designed to prevent gas leakage and/or permeation. In the preferred embodiment, the envelope is then evacuated and sealed. If the precipitated silica - fly ash mixture has been dried in a microporous pouch, the microporous pouch can be placed directly into the gas barrier envelope. Either before, or during, evacuation of the envelope, the precipitated silica - fly ash mixture is subjected to compression to provide a desired density which allows for superior insulation with a sufficiently thin construction and at low cost. After compression and evacuation, the gas barrier envelopes containing the compressed precipitated silica - fly ash mixture are in, essentially, a board like form, so that they can easily be placed into the structure where insulation is to be provided. Under these circumstances, the panels may be used alone or they can be attached to a surface such as by adhesive where thermal insulation is desired. If desired, foamed-in-place insulation, such as polyurethane foam, can be added to the insulation space to surround and imbed the panels formed of the mixture of precipitated silica and fly ash. One method which has been employed is attachment of the panels to the walls of the insulation space by means of foam spacer blocks, which results in complete encapsulation of the panels by the foamed-in-place insulation.

BRIEF DESCRIPTION OF THE DRAWINGS

In the accompanying drawings:

FIG. 1 is a graph of the K factor versus the percent of one type of fly ash incorporated with precipitated silica as an insulation;

FIG. 2 is a graph of the K factor versus the percent of a second type of fly ash incorporated with precipitated silica as an insulation;

FIG. 3 is a graph of the K factor versus the percent of a third type of fly ash incorporated with precipitated silica as an insulation;

FIG. 4 is a partial cross-sectional view showing the mounting of an insulation panel formed in accordance with the present invention within the insulation space of a refrigerating device; and FIG. 5 is a view similar to FIG. 4 with additional insulation formed around the insulation panel.

DESCRIPTION OF THE PREFERRED EMBODIMENTS

The insulating material of the present invention is made by thoroughly mixing precipitated silica and fly ash material, the mixture having at least 30 parts, by weight, of the precipitated silica. Preferably, the ratio of precipitated silica to fly ash, by weight, is from 60:40 to 40:60.

The fly ash materials of this invention are the fine powder residue collected from the flue gases of coal fired power generation plants and have a median particle size under 100 microns and preferably under 50 microns. Depending on the feed to the combustion chamber, source of coal, plant operating conditions, and method of collection employed, fly ash materials vary in chemical and physical properties. Preferably, the fly ash has a combined total of silica, aluminum oxide, and ferric oxide of at least 40% and less than 10% magnesium oxide. Most preferably, the combined total of silica, aluminum oxide, and ferric oxide is greater than 80% and the magnesium oxide total is less than 5%.

Because of the variations in composition, inherent in fly ash materials, several materials from different sources have been employed in examples of the present invention. The examples set forth herein show that fly ash materials of composition ranging from those obtained from efficient coal fired plants to ash from the atmospheric fluidized bed combustion process, which utilizes a mixed feed of coal and limestone, are all useful in the present invention.

The fly ashes are the fine residue resulting from the burning of ground or pulverized coal which, due to their finely divided state, are carried from the combustion chamber by the exhaust gases into precipitators. The fly ashes are generally collected from the flue gases of coal-fired power plants by either electrostatic or mechanical precipitators. As such, they consist principally of the oxides of silicon, aluminum, and iron, with varying amounts of unburned carbon. Other trace elements, such as potassium, phosphorous, cobalt, molybdenum, boron, and manganese, can also be present. The incombustible, inorganic particles of fly ash are usually spherical in shape and vary in size and density, though most are solid and contain iron components. The color of the fly ashes vary from light tan to brown and from gray to black. There are variations in the chemical and physical properties of the fly ash depending upon the power plant from which the fly ash is obtained and the generating units employed. However, as indicated, fly ashes which meet the standards set forth above have been found useful in accordance with the present invention.

The particle shapes and sizes of the fly ash differ, again depending upon the power plant and generating unit, though they generally consist of solid and hollow particles of spherical shape. The particles are siliceous and aluminous and include some quartz, small needle-shaped fragments of mullite, minute quantities of hematite or magnetite, and varying amounts of carbon. The median particle sizes of the fly ash depend primarily on the collection system and efficiency of the plant operation. We have found that fly ash having a median particle size of 100 microns or less and preferably under 50 microns, when used in accordance with the process described herein, yields the desired low thermal conductivity.

The proportion of hollow to solid spheres in fly ash also varies in accordance with the collection system employed, the source of coal, the plant operating conditions, and the temperature of combustion. The hollow particles are called cenospheres and are light weight particles composed of silicate spheres filled with nitrogen and carbon dioxide, varying in size from 20 to 200 microns in diameter. The cenospheres can comprise as much as 5% by weight, or 20% by volume, of the fly ash. The higher contents usually result from coal which is high in $Fe_2O_3$ content and fusion temperatures in excess of 2,600° F. (1,400° C.).

In order to employ the combination of precipitated silica and fly ash in accordance with the present invention, the two materials are first thoroughly blended. The blend is then placed in an essentially air and watertight pouch where it is subjected to pressure and vacuum to form a material of board-like consistency. This material is generally from one-half to one inch in thickness and is flat. The length and width of the panel which results from the treatment is limited only by the size of the piece of equipment, such as a freezer or refrigerator, in which it is to be inserted.

When the insulation materials of the present invention are formed in the manner just described, the panels are found to have K values of approximately 0.05 BTU-IN/HR.FT$^2$°F., and even lower. It has previously been found that K values in this range are desirable for the production of refrigerators and freezers.

In forming the insulating panels of the present invention, the mixture of precipitated silica and fly ash is first dried. If desired, the mixture of silica and fly ash may be placed in a microporous pouch, the pouch merely used as an aid in holding the powdery silica and fly ash during the drying operation. If it is desired to use such a microporous material, among the materials which can be employed is a polypropylene, sold by Celanese under the name "Celgard." Additionally, the types of paper used as filter paper can be employed. In general, any material which allows the passage of air and moisture, but holds the finely divided silica and fly ash can be used.

In the drying operation, whether or not the microporous pouch is employed, the temperature should be sufficient to drive off the surface water. Generally, this means, when a microporous pouch is employed, a temperature of approximately 100° C., the upper limit being one at which the microporous material will not char, melt, or degrade.

Subsequent to the drying operation, the dried mixture of silica and fly ash is pressed to form a cake which has a density in the range from about 10 to 35 pounds per cubic foot, preferably, 10 to 25 pounds per cubic foot. The materials employed in accordance with the present invention, with such densities, provide the desired K-factor of 0.05 BTU-IN/HR.FT.$^2$°F., or lower. The dried mixture of silica and fly ash is placed into a further, gas-barrier pouch, this pouch being formed in such a way as to prevent gas leakage. If the mixture of silica and fly ash has been dried in a microporous pouch, the microporous pouch is merely placed into the gas barrier envelope. In general, gas leakage is prevented in the envelope through use of a barrier film consisting of one or more layers of polymeric, metallized polymeric, or metal foil laminas. For example, a type of envelope which has been found useful in accordance with the present invention is one formed from five layers of a polymer, including four polyester layers metallized on five surfaces to provide a gas barrier, and one polymeric, heat-sealable, inner layer.

The overall thickness of the envelope should be small enough that there is little conduction of heat through the edges. In general, the overall thickness should be from approximately 0.003 to 0.020 inch. While the thinner materials provide sufficient strength to hold the mixture of silica and fly ash and allow the further processing necessary, the life expectancy of the apparatus into which they are placed may be reduced. However, life expectancies of five years, and more, can be expected even with the 0.003 thickness envelope.

After placing of the dried silica and fly ash into the gas barrier envelope, the envelope is evacuated and sealed by any suitable means, e.g., heat sealing or adhesive bonding. Preferably, an internal pressure below 10 mm. Hg is desired, though, depending upon the filler material, a slightly higher pressure, for example in the range of 15 mm., can be tolerated. The amount of vacuum necessary is based upon the K factor which, as indicated, should be no higher than 0.05. If desired, prior to evacuation, an inert gas, such as carbon dioxide or nitrogen, can be used to purge the air from the envelope.

If desired foamed-in-place insulation, such as polyurethane foam, can be added to the insulation space to surround and imbed the panels formed of the mixture of precipitated silica and fly ash. One method which has been employed is attachment of the panels to the insulation space walls by means of foam spacer blocks which results in complete encapsulation of the panels by the foamed-in-place insulation. The insulator blocks can be attached to the walls and panels by means of adhesive. With the panels now in place, insulation is formed within the insulation chamber to, essentially, fill the chamber and thereby encapsulate the panels.

The following are examples of the practice of the present invention. They should be considered only as exemplary, and not as limiting in any way the full scope of the present invention.

EXAMPLE 1

A thermal insulation panel was prepared from various mixtures of fly ash and a precipitated silica sold by PPG under the designation T-690. This T-690 precipitated silica had a surface area of 150 m$^2$g by the BET method, a median agglomerate size of 1.3 microns, a tapped density of 4 Lbs/Ft$^3$, a pH of 7, and a DBP absorption of 150. This precipitated silica was thoroughly blended with a fly ash obtained from the Kentucky Center for Energy Research Laboratory designated PFA I.

The PFA I shows the analysis set forth in Table 1:

TABLE 1

| PROPERTY | WEIGHT PERCENT |
|---|---|
| Moisture | 0.10 |
| Ash | 98.43 |
| Volatile Matter | 1.00 |
| Fixed Carbon | 0.50 |
| Loss on Ignition | 2.50 |

The median particle size of the fly ash was 21.76 microns, with a maximum particle size of 176 microns.

The major elements in the ash were as shown in Table 2.

TABLE 2

| COMPONENT | WEIGHT PERCENT |
|---|---|
| SiO$_2$ | 51.50 |
| TiO$_2$ | 2.23 |
| Al$_2$O$_3$ | 27.01 |
| Fe$_2$O$_3$ | 3.98 |
| CaO | 1.43 |
| MgO | 0.78 |
| K$_2$O | 2.62 |
| Na$_2$O | <0.1 |

After thoroughly blending the precipitated silica and the fly ash designated PFA I, and in varying percentages as will be set forth below, each mixture was placed into a microporous pouch. The microporous pouch was formed of a material sold under the name "Celgard." After placement of the mixture into the microporous envelope, the fourth side of the envelope was heat sealed and the panel was then placed in an oven and held at 105° C. for 16 hours. The dried mixture in the microporous pouch was pressed to the desired density and then placed into a metallized plastic envelope. The envelope employed was of the same construction described previously, for a gas barrier envelope, the thickness of the envelope material being 0.004 inch. After placement of the microporous pouch into the metallized plastic envelope, the envelope was evacuated to a pressure of 2 torr, and sealed.

A number of mixtures of the precipitated silica and PFA I fly ash were made in accordance with the procedure described, with results as shown in Table 3.

TABLE 3

| WEIGHT RATIO PRECIPITATED SILICA/PFA I | DENSITY | K FACTOR (BTU-IN/HR FT$^2$ °F.) |
|---|---|---|
| 40/60 | 24.1 | 0.036 |
| 50/50 | 21.3 | 0.035 |
| 70/30 | 16.7 | 0.031 |
| 80/20 | 14.2 | 0.029 |
| 90/10 | 12.8 | 0.032 |

It will thus be appreciated that all of the insulation panels made with these mixtures of precipitated silica and fly ash showed a K factor with an acceptable value, i.e., less than 0.05. A plot of the K factor versus varying ratios of this precipitated silica and fly ash is shown in FIG. 1.

EXAMPLE 2

Thermal insulation panels were made employing the same precipitated silica and the same procedures as in Example 1, but employing a precipitated fly ash obtained from the TVA Shawnee plant and designated PFA II. The median particle size in this fly ash was 7.32 and the maximum was 88 microns. The PFA II had the analysis shown below in Table 4:

TABLE 4

| PROPERTY | WEIGHT PERCENT |
|---|---|
| Moisture | 0.31 |
| Ash | 91.47 |
| Volatile Matter | 2.40 |
| Fixed Carbon | 5.80 |
| Loss on ignition | 0.22 |

The elemental analysis of the PFA II fly ash is as shown below in Table 5:

TABLE 5

| CONSTITUENT | WEIGHT PERCENT |
|---|---|
| SiO$_2$ | 55.16 |
| TiO$_2$ | 1.86 |
| Al$_2$O$_3$ | 33.27 |
| Fe$_2$O$_3$ | 4.87 |
| CaO | 1.01 |
| MgO | 0.84 |
| K$_2$O | 2.00 |
| Na$_2$O | 0.54 |
| P$_2$O$_5$ | 0.19 |
| SO$_3$ | 0.13 |

Again, the mixtures of precipitated silica and fly ash were in varying ratios and the results are shown below in Table 6:

TABLE 6

| WEIGHT RATIO PRECIPITATED SILICA/FLY ASH | DENSITY | K FACTOR (BTU-IN/HR FT² °F.) |
|---|---|---|
| 30/70 | 29.7 | 0.041 |
| 40/60 | 24.2 | 0.035 |
| 50/50 | 20.9 | 0.033 |
| 60/40 | 18 | 0.029 |
| 70/30 | 15.79 | 0.028 |
| 80/20 | 14.1 | 0.030 |
| 90/10 | 12.9 | 0.030 |

Again, it will be appreciated that all of the mixtures provided insulation panels with a desirable K-factor, below 0.05. A plot of the K factors versus the precipitated silica/fly ash ratio for the panels of this Example are shown in FIG. 2.

It will be noted that the PFA II material blended in a weight ratio of precipitated silica to fly ash of 70:30 had a K factor of 0.028. In the case of PFA II material blended in the same ratio, 70:30, but with no evacuation of the envelope, a K factor of about 0.2 was obtained. Fiberglass, which is commonly used in home insulation, has a K factor of about 0.35, and when fiberglass having various binders is used in refrigerators and freezers, the K factor is about 0.235. Therefore, the material of this invention has a better insulating quality than that of fiberglass, even without evacuating the envelope.

EXAMPLE 3

Thermal insulation panels were made employing the same precipitated silica and the same procedures as in Example 1, but employing a precipitated fly ash obtained from the TVA Bull Run plant and designated PFA III. The median particle size in this fly ash was 20 and the maximum was 176 microns. The PFA III had the analysis shown below in Table 7:

TABLE 7

| PROPERTY | WEIGHT PERCENT |
|---|---|
| Moisture | 0.25 |
| Ash | 94.48 |
| Volatile Matter | 1.55 |
| Fixed Carbon | 3.75 |
| Loss on ignition | 5.69 |

The constituent analysis of the PFA III fly ash is shown, below, in Table 8:

TABLE 8

| CONSTITUENT | WEIGHT PERCENT |
|---|---|
| $SiO_2$ | 48.46 |
| $TiO_2$ | 2.21 |
| $Al_2O_3$ | 31.31 |
| $Fe_2O_3$ | 4.02 |
| CaO | 1.58 |
| MgO | 0.74 |
| $K_2O$ | 2.43 |
| $Na_2O$ | 10.1 |

Again, varying ratios of precipitated silica and the PFA III fly ash were employed to make insulation panels, with results as indicated in Table 9:

TABLE 9

| WEIGHT RATIO PRECIPITATED SILICA/FLY ASH | DENSITY | K FACTOR (BTU-IN/HR FT² °F.) |
|---|---|---|
| 30/70 | 31.6 | 0.046 |
| 40/60 | 24.2 | 0.037 |
| 50/50 | 20.2 | 0.036 |

TABLE 9-continued

| WEIGHT RATIO PRECIPITATED SILICA/FLY ASH | DENSITY | K FACTOR (BTU-IN/HR FT² °F.) |
|---|---|---|
| 60/40 | 18 | 0.029 |
| 70/30 | 16.68 | 0.031 |
| 80/20 | 14.2 | 0.031 |
| 90/10 | 12.9 | 0.031 |

In all of the ratios employed, the K factor of the panels formed with the mixtures of precipitated silica and PFA III were acceptable, i.e., below 0.05. A plot of the K values versus the ratio of precipitated silica to PFA III is shown in FIG. 3.

EXAMPLE 4

Thermal insulation panels were made employing the same precipitated silica and the same procedures as in Example 1, but employing a precipitated fly ash designated PFA IV. The median particle size in this fly ash was 10 and the maximum was 88 microns. The PFA IV had the analysis shown in Table 10:

TABLE 10

| PROPERTY | WEIGHT PERCENT |
|---|---|
| Moisture | 1.01 |
| Ash | 97.89 |
| Volatile Matter | 1.00 |
| Fixed Carbon | 0.10 |
| Loss on ignition | 1.63 |

The chemical analysis of the PFA IV is shown in Table 11:

TABLE 11

| CONSTITUENT | WEIGHT PERCENT |
|---|---|
| $SiO_2$ | 37.31 |
| $TiO_2$ | 1.28 |
| $Al_2O_3$ | 20.37 |
| $Fe_2O_3$ | 4.01 |
| CaO | 23.59 |
| MgO | 6.29 |
| $K_2O$ | 0.33 |
| $Na_2O$ | 2.46 |
| $P_2O_5$ | 1.07 |
| $SO_3$ | 3.30 |

The results of tests on two blends of PFA IV fly ash and precipitated silica are shown in Table 12.

TABLE 12

| WEIGHT RATIO PRECIPITATED SILICA/FLY ASH | DENSITY | K FACTOR (BTU-IN/HR FT² °F.) |
|---|---|---|
| 50/50 | 20.3 | 0.030 |
| 70/30 | 16 | 0.028 |

Again, both of the samples employed showed acceptable K values, i.e., below 0.05.

EXAMPLE 5

Thermal insulation panels were made employing the same precipitated silica and the same procedures as in Example 1, but employing a precipitated fly ash obtained from the Kentucky Center for Energy Research Pilot Plant and designated AFBC Bag House. The median particle size in this fly ash was 4.33 and the maximum was 62 microns. The AFBC Bag House had the analysis shown in Table 13:

TABLE 13

| PROPERTY | WEIGHT PERCENT |
| --- | --- |
| Moisture | 0.61 |
| Ash | 90.36 |
| Volatile Matter | 9.0 |
| Loss on ignition | 7.33 |

The chemical constituency of this material was as shown in Table 14.

TABLE 14

| CONSTITUENT | WEIGHT PERCENT |
| --- | --- |
| $SiO_2$ | 19.47 |
| $TiO_2$ | 0.68 |
| $Al_2O_3$ | 12.08 |
| $Fe_2O_3$ | 16.67 |
| $CaO$ | 30.38 |
| $MgO$ | 0.61 |
| $K_2O$ | 1.53 |
| $Na_2O$ | 0.35 |
| $P_2O_5$ | 0.13 |
| $SO_3$ | 17.22 |

Results of tests on 3 blends of AFBC ash with precipitated silica are shown in Table 15.

TABLE 15

| WEIGHT RATIO PRECIPITATED SILICA/FLY ASH | DENSITY | K FACTOR (BTU-IN/HR $FT^2$ °F.) |
| --- | --- | --- |
| 40/60 | 23.2 | 0.035 |
| 50/50 | 19.5 | 0.037 |
| 60/40 | 18.5 | 0.039 |

Again, all of the insulation panels made were acceptable, i.e., below 0.05 K factor.

Results similar to those achieved in Examples 1 through 5 are achieved when the PPG T-690 is replaced by the same amount of Degussa Corporation precipitated silica sold under the designation FK500-LS. This precipitated silica has a surface area of 450 $m^2/g$, a dibutylphthalate absorption of 300%, a mean secondary particle size of about 3 microns, and a $SiO_2$ content of 99%. It had a tapped density of 80 g/l, a drying loss for 2 hours at 105° C. of less than or equal to 3%, an ignition loss for 2 hours at 1,000° C. of 5%, and a pH in a 5% aqueous suspension of 7.

The thermal insulation material, which is made in accordance with the present invention, may be used in various environments where thermal insulation is needed. As mentioned previously, it may be utilized without evacuation of the envelope that contains the material. As such, it may be suitable as a substitute for fiberglass insulation since it has better thermal insulating qualities. It may be used in place of polyurethane foam and, particularly, in an environment where it is subjected to relatively high temperatures. The envelope or panel containing the material of the present invention may be used to insulate a space by having the panel form part of the walls surrounding the space to be thermally insulated. The panels may also be attached to one or more walls of the space to be insulated, or they may be sandwiched between a double wall which may form the space to be insulated. In the case of refrigerators and freezers, particularly, the space to be insulated is surrounded by a double wall which is commonly referred to as the inner liner and the outer case. One method found particularly suitable for incorporating insulation panels formed in accordance with the present invention is by attaching, as by adhesive, the formed insulation panels to the inside surface of the outer case wall or to the inside surface of the liner wall and then filling the space 10 between the two walls with a foamed in place plastic 11, such as polyurethane foam. Another method is illustrated in FIGS. 4 and 5. As shown in those figures, the insulating panel 1, which is the compressed mixture of a precipitated silica and fly ash within the various envelopes, as set forth above, is attached to the inner surface of the outer case wall 2 by means of foam blocks 3. Adhesive is applied to these foam blocks as at 4 to adhere them both to the inner surface of the outer case wall and to the insulation panel. It will be appreciated that the wall designated as 2 can be either the outer case wall or the inner liner wall. After a sufficient number of insulating panels 1 have been attached to the appropriate wall 2, the space 10, between the two walls, is filled with a foamed in place plastic 11, such as polyurethane foam, which surrounds the panels 1 and blocks 3 and provides a full insulation to the space between the walls 2 and 2'. It will be appreicated that the insulating panels 1 can be attached to either the walls 2 or 2', as desired, without affecting the overall insulating properties of the device. The material which is foamed in place to occupy the space 10 in FIG. 5 can be any of the standard insulating foams employed in this art.

In accordance with the present invention, the use of a mixture of precipitated silica and fly ash as an insulating material has been shown and described. Further, a method for using the material of this invention and for installing the panels formed in accordance with the present invention has been described and illustrated. The invention should not be considered as limited to the specific examples, but only as shown and described in the appended claims.

We claim:

1. A slab of board-like material for use as a thermal insulation comprising:
    a. a precipitated silica and a fly ash material, there being between 30% and 70% of said fly ash material based upon the total weight of said precipitated silica and fly ash material; and
    b. a gas and water tight envelope containing said mixture of precipitated silica and fly ash material.

2. The material of claim 1 wherein the ratio of precipitated silica to fly ash material, by weight, is from 60:40 to 40:60.

3. The material of claim 1 wherein the median particle size is under 100 microns.

4. The material of claim 1 wherein said mixture of precipitated silica and fly ash is dried in a microporous pouch.

5. The material of claim 4 wherein said microporous pouch is placed within said gas and water-tight envelope.

6. The material of claim 1 wherein said gas and water-tight envelope containing said mixture of precipitated silica and fly ash material, is compressed to a density of between 10 and 35 pounds per cubic foot.

7. A process for forming a thermal insulation panel comprising:
    a. forming a slab of board-like material for use as a thermal insulation comprising a mixture of precipitated silica and fly ash material, said fly ash material comprising between 30% and 70% said mixture;

b. drying said mixture of precipitated silica and fly ash material at a temperature sufficient to drive off surface water;

c. compressing said mixture of precipitated silica and fly ash material to a density of from 10 to 35 pounds per cubic foot;

d. placing said compressed mixture of precipitated silica and fly ash material in an envelope; and e. sealing said envelope.

8. The process of claim 7 wherein said mixture of precipitated silica and fly ash material is dried in a microporous pouch.

9. The process of claim 7 wherein the ratio of precipitated silica to fly ash material, by weight is form 60:40 to 40:60.

10. The process of claim 7 wherein the envelope is gas and water tight and is evacuated.

11. The process of claim 10 wherein said gas and water-tight envelope is a multi-layer structure formed of plastic having metallized layers.

12. The process of claim 11 wherein at least one of said metallized layers is an aluminized plastic layer.

13. The process of claim 11 wherein at least one of said plastic layers is formed of polypropylene.

14. The process of claim 11 wherein at least one of said layers is metal foil.

15. A thermal insulation material comprising a precipitated silica and a fly ash material, there being between 30% and 70% of said fly ash material based upon the total weight of said precipitated silica and fly ash material.

16. The thermal insulation material of claim 15 wherein the ratio of precipitated silica to fly ash material, by weight, is from 60:40 to 40:60.

17. A process for forming an insulating layer between an inner wall and an outer wall of a cooling device comprising:

a. forming a slab of board-like material for use as a thermal insulation comprising a mixture of precipitated silica and fly ash material, said precipitated silica comprising at least 30% of said mixture;

b. drying said mixture of precpitated silica and fly ash material at a temperature sufficient to drive off surface water;

c. compressing said mixture of precipitated silica and fly ash material to a density of from 10 to 35 pounds per cubic foot;

d. placing said compressed mixture of precipitated silica and fly ash material in a gas and water tight envelope;

e. evacuating said gas and water tight envelope;

f. sealing said gas and water-tight envelope;

g. attaching said sealed gas and water-tight envelope, to the surface of one wall within the insulation space of said cooling device; and h. filling the remainder of said insulation space with a foamed insulation material.

18. The process of claim 17 wherein the envelope is attached by adhesive to the wall.

19. The process of claim 17 wherein the envelope is attached to foam blocks by adhesive and the foam blocks are attached to the surface of one wall within the insulation space.

* * * * *